(12) United States Patent
Kanayama et al.

(10) Patent No.: US 6,285,511 B1
(45) Date of Patent: Sep. 4, 2001

(54) MANUAL AND AUTOMATIC APPARATUS FOR LENS BARREL

(75) Inventors: Atsushi Kanayama; Keiji Kaneko, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/645,346

(22) Filed: Aug. 25, 2000

(30) Foreign Application Priority Data

| Sep. 7, 1999 | (JP) | ................................................ 11-253465 |
| Sep. 7, 1999 | (JP) | ................................................ 11-253466 |
| Sep. 8, 1999 | (JP) | ................................................ 11-253793 |

(51) Int. Cl.$^7$ .......................... G02B 15/14; G02B 13/34; G02B 13/00; G02B 3/10
(52) U.S. Cl. .......................... 359/696; 359/697; 396/133; 396/137
(58) Field of Search .................................. 359/694, 696, 359/697, 823; 396/133, 137

(56) References Cited

U.S. PATENT DOCUMENTS

| 4,739,359 | * | 4/1988 | Fukahori et al. | ....................... 396/85 |
| 5,229,800 | * | 7/1993 | Kanno et al. | .......................... 396/137 |
| 5,561,561 | * | 10/1996 | Fukino | ................................. 359/696 |

OTHER PUBLICATIONS

Japanese Patent Office, *Patent Abstracts of Japan,* Publication No. 02285311 A, Date of Publication, Nov. 22, 1990, Application No. 1105883, Date of Filing: Apr. 27, 1989.

Japanese Patent Office, *Patent Abstracts of Japan,* Publication No. 11101932, Date of Publication: Apr. 13, 1999, Application No. 09264078, Date of Filing: Sep. 29, 1997.

* cited by examiner

*Primary Examiner*—Ricky Mack
(74) *Attorney, Agent, or Firm*—Ronald R. Snider; Snider & Associates

(57) ABSTRACT

The present invention is an apparatus not requiring the change of manual and automatic operations, preventing a lens from unexpectedly moving under manual operation, and making it possible to perform manual operation when a driving speed is low even under automatic operation. The apparatus has an automatic manual-and-automatic-operation change mode for automatically driving a lens by a zoom switch in a predetermined direction by connecting a zooming ring to a zoom motor through a clutch mechanism and connecting or disconnecting the clutch mechanism by a clutch-operating motor, and making it possible to automatically perform manual operation when the zoom switch is not operated. Moreover, the apparatus has a manual-operation mode for enabling only manual operation in addition to the change mode so that automatic operation is not performed even if an operator touches the zoom switch. Furthermore, the apparatus controls the operation torque of an operation ring generated by the clutch mechanism so that the torque decreases an a driving speed set by the zoom switch lowers and so that manual operation can be performed even while automatic operation is performed by pressing the zoom switch. Furthermore, the apparatus variably controls a clutch position under automatic operation ON or OFF correspondingly to an environmental temperature and secures stable rotation of a lens-operating ring.

7 Claims, 12 Drawing Sheets

AT ORDINARY TEMPERATURE

AT LOW TEMPERATURE

AT HIGH TEMPERATURE

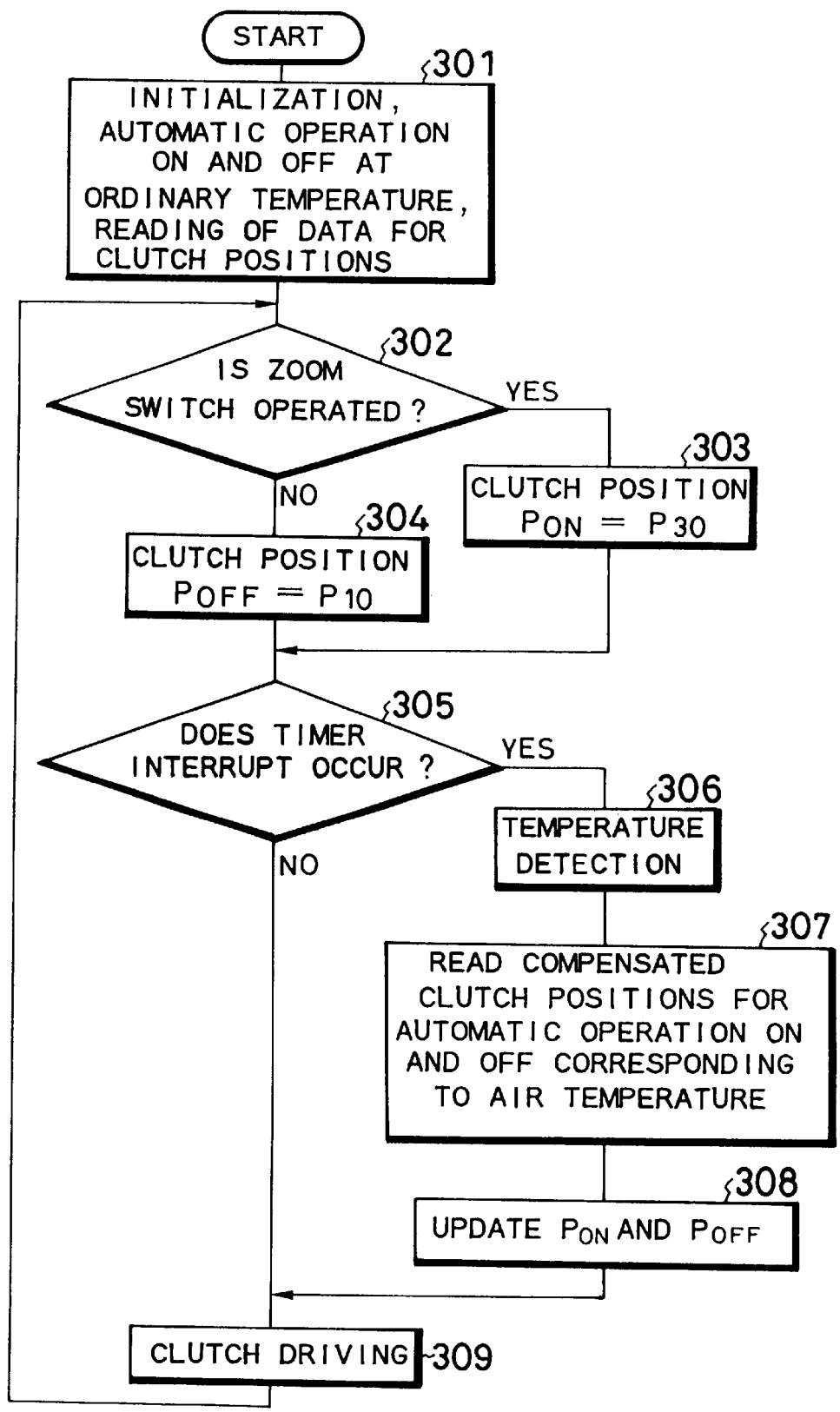

MANUAL AND AUTOMATIC APPARATUS FOR LENS BARREL

RELATED APPLICATIONS

This application claims the priority of Japanese Patent Application Nos. 11-253465 and 11-253466 filed on Sep. 7, 1999 and Japanese Application No. 11-253793 filed on Sep. 8, 1999, which are incorporated herein by reference.

BACKGROUND OF THE INVENTION

1. Field of the Invention

The present invention relates to a manual and automatic apparatus for a lens barrel configured so that zooming and focusing operations of a lens can be changed without changing manual and automatic operations.

2. Description of the Prior Art

A conventional lens barrel used for a camera or a television camera is provided with a focus lens for adjusting the focus and a zoom lens for changing powers. These lenses can be manually or automatically operated by a change-operation knob. For example, one of these lenses is disclosed in Japanese Patent Laid-Open No. 02285311A.

That is, in the case of a zooming function, external teeth are formed on the periphery of a zooming ring, a change gear is set to the external teeth so as to be engaged with or disengaged from the teeth, rotation of an electric motor is transmitted via the change gear, and the change gear is moved by a change-operation knob. According to the function, by operating the change-operation knob and engaging the change gear with the external teeth of the zooming ring, it is possible to automatically drive the zoom lens by automatically operating the zooming ring, manually operate the zooming ring by disengaging the change gear from the external teeth, and set a desired magnification.

BRIEF SUMMARY OF THE INVENTION

OBJECT OF THE INVENTION

The above conventional lens barrel that can be manually or automatically operated requires the change operation for rotating the change-operation knob. However, the change operation is complicated and moreover, a trouble occurs that a photographing opportunity is missed because focusing an object is not quickly performed due to the change operation.

Therefore, the present applicant proposes a manual and automatic apparatus for a lens barrel requiring no change operation by using a clutch mechanism in accordance with U.S. patent application Ser. No. 09/504,038. That is, when pressing an automatic operation switch (zoom seesaw) for zooming (the same is true for focusing), rotation of an electric motor is transmitted to a lens-operating ring through the connecting operation of a clutch mechanism, a zoom lens is automatically driven. When releasing the automatic operation switch (canceling of pressed state), the clutch mechanism performs disconnecting operation, and thereby the lens-operating ring can be manually operated.

In the case of the manual and automatic apparatus for a lens barrel, however, if an operator erroneously contacts an automatic operation switch (zoom seesaw) under manual operation, a trouble occurs that a zoom lens unexpectedly moves. In the case of photographing by a camera, there is a case in which only manual operation is performed and automatic operation is unnecessary according to circumstances. In this case, operability is deteriorated.

Moreover, in the case of the above manual and automatic apparatus for a lens barrel requiring no change operation, if a lens can be quickly manually moved in the same direction or opposite direction when the above zoom seesaw is slightly pushed and automatically slowly moved, a quick camera work not missing a photographing opportunity may be realized. However, when the zoom seesaw is operated, the lens-operating ring is very heavy because the clutch mechanism is comparatively firmly connected. Therefore, it is difficult to manually move the ring.

In general, to change automatic operation to manual operation, the operation of a zoom seesaw is stopped and then, a lens-operating ring is operated. In this case, no major problems arise, but to perform photographing again at a speed at which slow zooming with a small push-in value (depth) of the zoom seesaw is performed (for example, a case of returning a zoom lens which has been moved from wide angle direction to telescopic direction to the wide angle direction and moving it in the telescopic direction again), it is effective to manually operate a lens-operating ring during automatic operation.

That is, if an operator once separates his hand from the zoom seesaw or performs zooming in the opposite direction, it is necessary to set the zoom-seesaw push-in value equivalent to the slow zooming rate previously used again. This operation is complex. Therefore, a zoom seesaw moving from wide angle to telescopic directions which can be once returned to the wide angle direction is desired. Moreover, the same is true for a zoom seesaw having a constant-speed zooming function of storing a zoom-seesaw push-in value and constantly performing zooming at the speed equivalent to the stored value (e.g. official gazette of Japanese Patent Laid-Open No. 11-101932).

Moreover, in the manual and automatic apparatus for a lens barrel, the clutch mechanism and a mechanism for moving a lens by a lens-operating ring are set so that they are brought into an optimum state at ordinary temperature. For example, when using the apparatus at a low temperature, the operation torque under manual operation increases or the rotational speed under automatic operation lowers. Particularly, grease is used for a mechanically movable portion and change of viscosities of the grease due to temperature becomes a large cause. Thus, at a temperature greatly different from ordinary temperature, stable manipulation or operation cannot be secured.

The present invention is made to solve the above problems and its first object is to provide a manual and automatic apparatus for a lens barrel not requiring the change of manual and automatic operations but allowing an operator to perform stable manual operation because a lens does not unexpectedly move under manual operation.

Moreover, it is the second object of the present invention to provide an apparatus not requiring the change of manual and automatic operations but allowing an operator to perform manual operation even under automatic operation when a driving speed is low and perform quick camera work.

Furthermore, it is the third object of the present invention to provide an apparatus not requiring the change of manual and automatic operations but capable of stabilizing the operability under manual operation or operations under automatic operation even when the apparatus is used at an environmental temperature out of ordinary temperature.

SUMMARY OF THE INVENTION

To attain the above first object, an aspect of the present invention comprises a lens barrel for holding a lens so as to be movable, a lens-operating ring rotatably set to the periphery of the lens barrel for manually moving the lens, an electric motor for automatically moving the lens, automatic manual-and-automatic (electric motor) -operation change means (circuit) for connecting the electric motor with the lens-operating ring by a clutch mechanism (the clutch mechanism is operated by a clutch-operating motor) and performing connection or disconnection of the clutch mechanism by making the connection or disconnection interlock with the operation of an automatic operation switch, and a mode change switch for changing an automatic manual-and-automatic-operation change mode for operating the automatic manual-and-automatic-operation change means and a manual-operation (single) mode for enabling only manual operation by disconnecting the clutch mechanism.

The above configuration can be provided with operation-torque change means for adjusting the pressure of the friction face of the clutch mechanism and changing manual operation torques of the lens-operating ring.

According to the present invention, by pressing an automatic zooming or focusing switch when setting an automatic manual-and-automatic-operation change mode, a clutch mechanism is connected by a clutch-operating motor. Therefore, rotation of an electric motor is transmitted to a lens-operating ring through a gear train and thereby, a predetermined lens is driven. Thereafter, when the automatic operation switch is released, connection of the clutch mechanism is canceled and manual operation is ready.

However, when changing the mode to a manual operation mode by the mode change switch, the clutch mechanism is always set to a disconnected state. Therefore, even if the automatic operation switch is pressed, the lens-operating ring does not move. Therefore, it is possible to stably control zooming and focusing through only manual operation.

Moreover, according to the operation-torque change means, the pressure on the friction face of the disconnected clutch mechanism is set to an optional value designated by an adjusting dial and the load due to pressing of the friction face is supplied as the operation torque (weight under operation) of the lens-operating ring. Thereby, an operator can freely perform manual operation at the set operation torque.

To achieve the above second object, another aspect of the present invention comprises not only the above lens barrel, lens-operating ring, and electric motor but also a clutch mechanism for connecting or disconnecting the electric motor with and from the lens-operating ring, an automatic operation switch for automatically driving the lens-operating ring through the clutch mechanism and setting the driving speed, and torque control means for changing connection forces (friction-face pressures) of the clutch mechanism in accordance with the driving speed set by the automatic operation switch and controlling the operation torque of the lens-operating ring (when clutch mechanism is connected) so as to decrease as the driving speed lowers.

According to the torque control means of the above another aspect of the present invention, a clutch position (connection position) is set to $P_1$ correspondingly to a depth-directional control input (pressed distance) of the automatic operation switch that is, correspondingly to the driving speed when the control input (or driving speed) is less than 60% of the maximum control input, set to $P_2$ ($P_1<P_2$) when the control input ranges between 60 and 80% of the maximum control input, and set to $P_{ON}$ (completely-connected clutch position) when the control input exceeds 80% of the maximum control input. In this case, an operation torque of the lens-operating ring (weight under operation) added by the clutch mechanism increases stepwise in order of the torque set at the position $P_1$, the torque set at the position $P_2$, and the torque set at the position $P_{ON}$. Therefore, a lens-operating ring decreases in weight as a lens is moved at a lower speed and it is possible to manually rotate the lens-operating ring even while an automatic operation switch is operated.

To achieve the above third object, still another aspect of the present invention comprises not only the above lens barrel, lens-operating ring, electric motor, and clutch mechanism but also a temperature sensor for measuring an environmental temperature and clutch control means for securing stable rotation of the lens-operating ring by changing friction-face pressures of the clutch mechanism correspondingly to a temperature detected by the temperature sensor.

According to the above still another aspect of the present invention, the environmental temperature detected by the temperature sensor is supplied to the clutch control means (CPU) and the control means compensates a clutch position of the clutch mechanism when temperature is out of the range of ordinary temperature. For example, in a low-temperature environment, the control means compensates the automatic-operation-ON position $P_{ON}$ under the connected state of the clutch mechanism so that a friction-face pressure (generated torque) increases and the automatic-operation-OFF clutch position $P_{OFF}$ so that the friction face pressure decreases. Therefore, even in an environment out of the range of ordinary temperature, stable manual operability and automatic operations same as those at ordinary temperature are maintained.

BRIEF DESCRIPTION OF THE DRAWINGS

FIG. 14 is a flow chart showing control operations executed by a CPU of the third embodiment.

DETAILED DESCRIPTION OF THE PREFERRED EMBODIMENTS

First Embodiment

Figure 3:
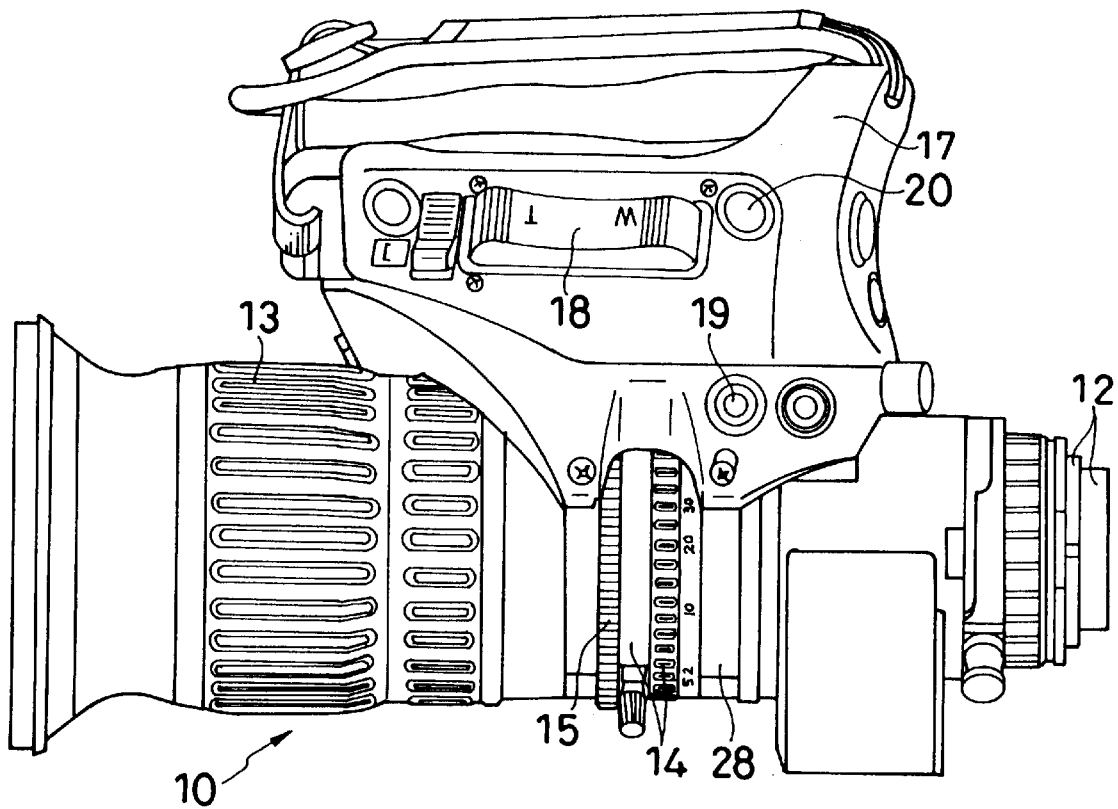
FIG. 3 is a top view showing the general configuration of a lens barrel of an embodiment.
Figure 4:
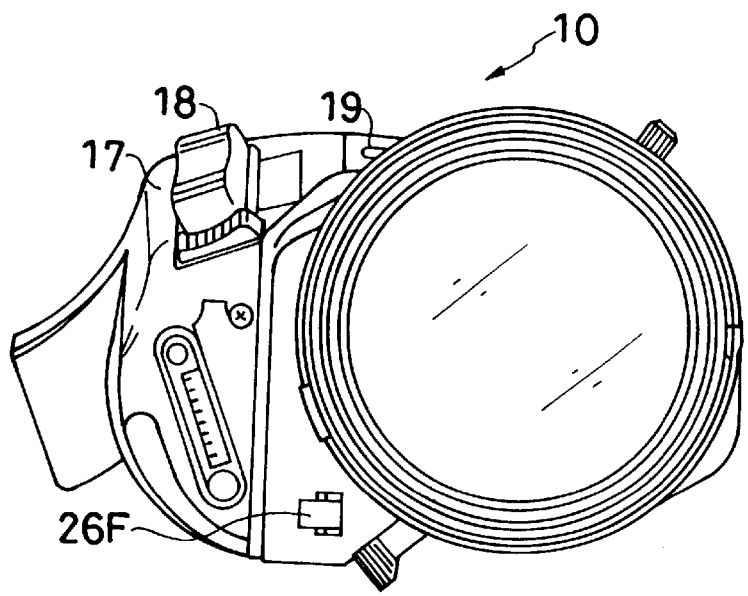
FIG. 4 is a front view of the lens barrel in FIG. 3.

First, the general configuration of the lens barrel of the embodiment will be described below by referring to FIGS. 3 to 5. Though a front-end hood is omitted in the case of the illustrated lens barrel 10, it is connected to a camera body by a rear-end joint 12. Moreover, a focus ring 13 and a zooming ring (both serve as lens-operating rings) 14 are set to the periphery of the lens barrel 10 so as to be manually rotatable and external teeth 15 for automatic driving are formed on the periphery of the zooming ring 14.

Furthermore, a zoom switch 18 for zooming and an adjusting dial (or preset switch) 19 for variably setting operation torque, and a return switch 20 are set to a holding portion 17 set to the periphery of the lens barrel 10. The zoom switch 18 is configured of a seesaw switch which is set to the telescopic (expanding) direction and wide angle (contracting) direction and whose both ends move upward and downward like a seesaw and set so that a change speed rises in accordance with a pressed depth. The adjusting dial 19 adjusts the pressure on the friction face of a clutch mechanism by a variable resistor as described later.

Figure 5:
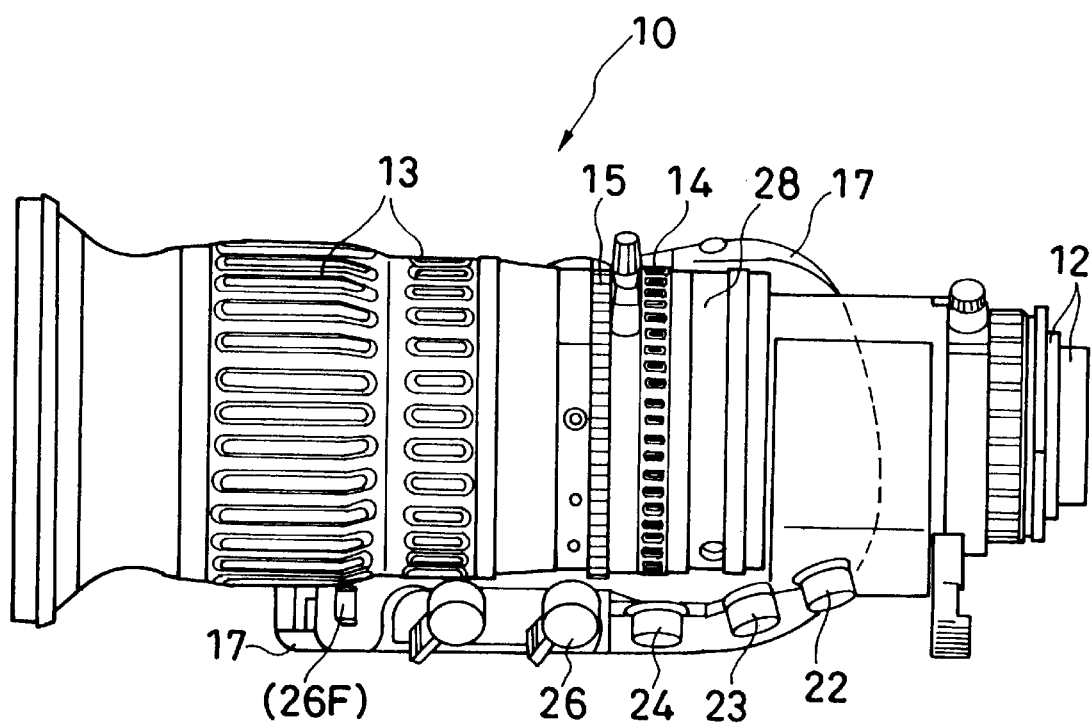
FIG. 5 is a bottom view of the lens barrel in FIG. 3.

Furthermore, as shown in FIG. 5, a zoom control connector 22, focus control connector 23, and serial-interface connector 24 to which remote-control cables are connected are set below the holding portion 17 and a mode change switch 26 for changing the automatic manual-and-automatic-operation change mode and the manual-operation (single) mode is set to the center of the holding portion next to the connector 24. As shown in FIG. 4, it is also permitted to set, instead of the mode change switch 26, a mode change switch 26F configured of a slide switch to the front of the holding portion 17. Moreover, the mechanism for automatic operation and a clutch mechanism for changing automatic and manual operations shown in FIG. 2 are set to the holding portion 17.

Figure 2:
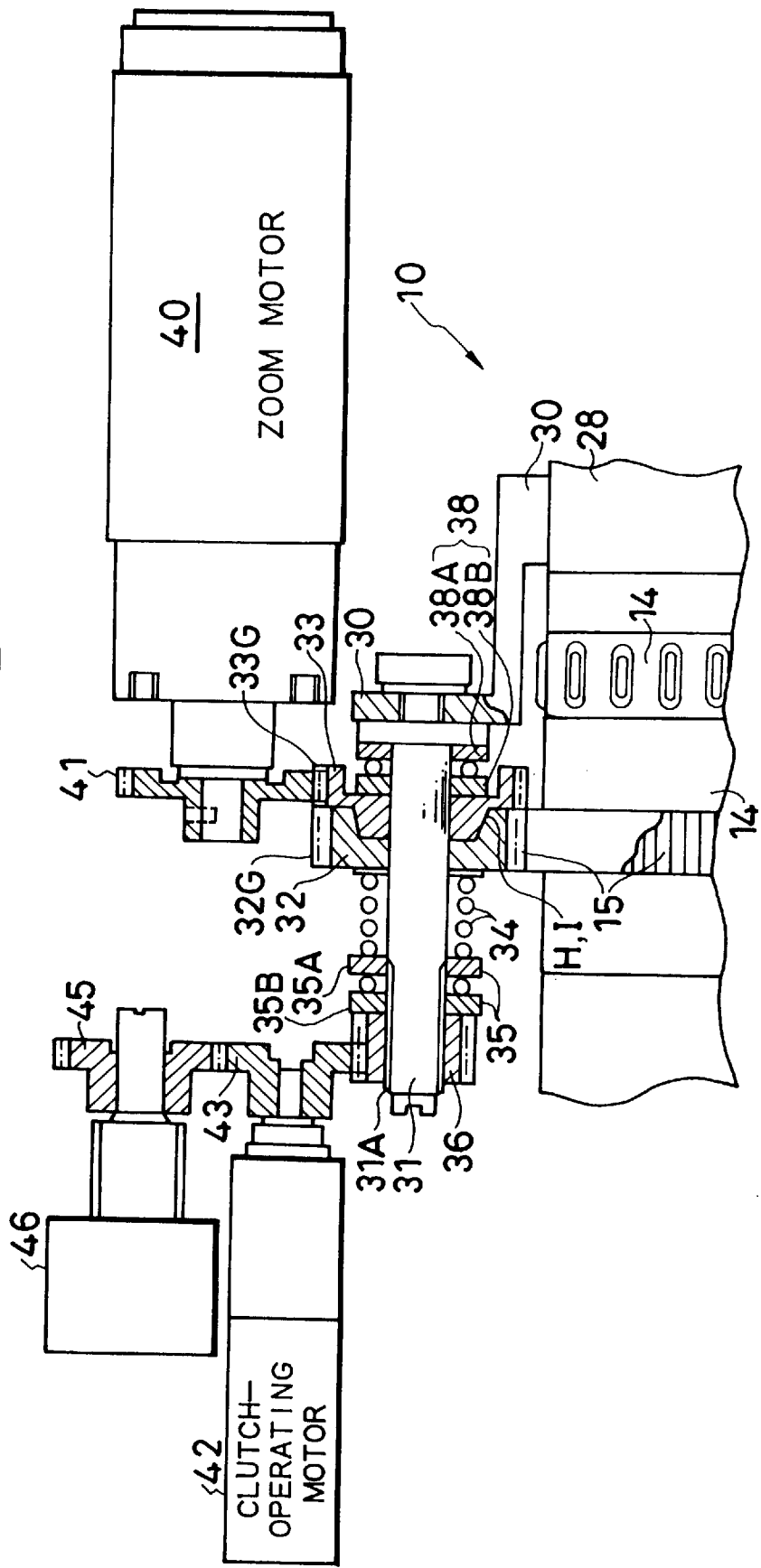
FIG. 2 is a mechanical configuration for changing manual and automatic operations of a manual and automatic apparatus for a lens barrel of an embodiment.

In FIG. 2, a clutch mechanism is set to a body ring 28 of the lens barrel 10 through a support member 30. That is, a main shaft 31 is fixed to the upper portion of the support member 30 and a discoid movable plate (gear moving plate which moves in the shaft direction) 32 and a fixed plate (gear fixing plate which is fixed in the shaft direction) 33 are set so as to be rotatable along the periphery of the main shaft 31. External teeth 32G and 33G are formed on peripheries of the movable plate 32 and fixed plate 33 and have functions of a clutch plate and a gear. External teeth 15 of the zooming ring 14 engage with the external teeth 32G of the movable plate 32.

As illustrated, in the case of the movable plate 32 and fixed plate 33 functioning as clutch plates, a circular groove (friction face) H having a tapered side face is formed on the movable plate 32 and fitted to the circular groove H and moreover, a fitting protrusion (friction face) I having a tapered face is formed on the fixed plate 33. A first thrust bearing 35 is set to the movable plate 32 through a coil spring 34 and the movable plate 32 is energized toward the fixed plate 33 by the coil spring 34. Therefore, clutch connection is achieved by the contact (friction) between the circular groove H and fitting protrusion I and the energizing pressure of the coil spring 34.

Moreover, a disk 35A of the first thrust bearing 35 at the coil-spring contact side (rear side) is rotatable along the periphery of the main shaft 31. However, another front disk 35B is fixed on a moving gear 36. The disk 35B and a gear 36 are screwed to a threaded portion 31A formed at the front of the main shaft 31. Therefore, the disk 35A, coil spring 34, and movable plate 32 rotate independently of the moving gear 36 and function as a disconnection-time rotational mechanism for rotating the movable plate 32 separately from the fixed plate 33 under manual operation.

Moreover, a second thrust bearing 38 is set to the fixed plate 33. In the case of the bearing 38, a rear disk 38A is fixed to the main shaft 31 and a front disk 38B rotates together with the fixed plate 33. Furthermore, a shaft gear 41 of a zoom motor 40 engages with the external teeth 33G of the fixed plate 33. Therefore, the torque of the zoom motor 40 is supplied to the zooming ring 14 through the shaft gear 41, fixed-plate external teeth 33G, movable-plate external teeth 32G, and external teeth 15 with the movable plate 32 being connected to the fixed plate 33.

Moreover, a clutch-operating motor 42 for operating the clutch mechanism is set and a shaft gear 43 of the motor 42 is engaged with the moving gear 36 at the first thrust bearing-35 side. Therefore, by rotating the clutch-operating motor 42 in a predetermined direction, it is possible to rotate the moving gear 36 and move the gear 36 backward and press the movable plate 32 against the fixed plate 33. Moreover, by rotating the motor 42 in the opposite direction, it is possible to separate the movable plate 32 from the fixed plate 33. Furthermore, a potentiometer 46 is connected to the shaft gear 43 of the clutch-operating motor 42 through a gear 45. The potentiometer 46 detects the rotating state (clutch position) of the moving gear 36 at the first thrust bearing-35 side, that is, the pressing state of the movable plate 32.

According to the configuration in FIG. 2, the moving gear 36 screwed to the main shaft 31 is moved backward by the clutch-operating motor 42, the movable plate 32 is strongly pressed against the fixed plate 33 through the coil spring 34, and the clutch mechanism is connected. Thereby, the rotation of the zoom motor 40 is transmitted to the zooming ring 14 through the gear 41, fixed-plate external teeth 33G, and movable-plate external teeth 32G. That is, in the telescopic direction or wide angle direction operated by the zoom switch 18, the zoom motor 40 rotates at a speed corresponding to a pressed depth (pressed distance) and thereby, zooming for enlargement or contraction is performed. Moreover, when the moving gear 36 is moved forward by the clutch-operating motor 42, the energizing force of the coil spring 34 is decreased, the pressure of the movable plate 32 against the fixed plate 33 is decreased, and as a result, the clutch mechanism is disconnected.

Then, in the case of this embodiment, rotational positions (clutch positions) of the moving gear 36 are changed by the clutch-operating motor 42 and the pressure (friction force) of the movable plate 32 against the fixed plate 33 through the coil spring 34 is adjusted. Thereby, it is possible to change manual operation torques of the zooming ring 14. That is, by keeping the movable plate 32 and fixed plate 33 so they contact each other at a low pressure without completely separating them from each other even when the clutch mechanism is disconnected and changing energizing forces of the coil spring 34 under the above state, it is possible to optionally set a manual operation torque.

Figure 1:
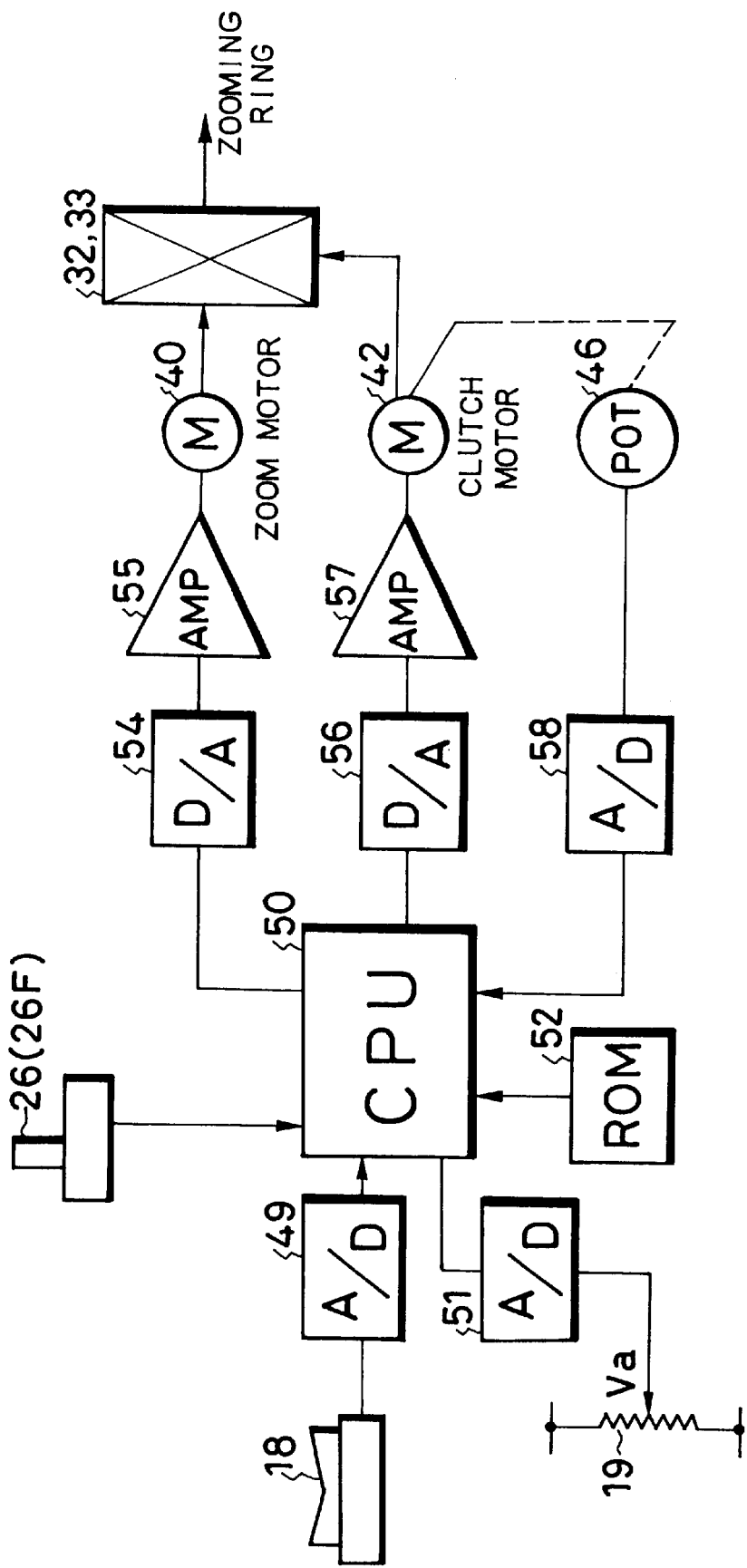
FIG. 1 is a circuit diagram showing an electrical configuration of a manual and automatic apparatus for a lens barrel of a first embodiment of the present invention.

FIG. 1 shows an electrical configuration of the first embodiment, in which the zoom switch 18 at the left of FIG.

1 is connected to a CPU 50 through an A/D converter 49. A signal of the mode change switch 26 (26F) and set voltage Va of a variable resistor (electronic dial for digital processing can also be used) of the adjusting dial 19 are input to the CPU 50 through an A/D converter 51 and a ROM 52 storing the data necessary for control operations is connected to the CPU 50. Moreover, an output control signal of the CPU 50 is supplied to the zoom motor 40 through a D/A converter 54 and a power amplifier 55 and the zoom motor 40 drives the zooming ring 14 through the above fixed plate 33 and movable plate 32.

Moreover, the output control signal of the CPU 50 is supplied to the clutch-operating motor 42 through a D/A converter 56 and a power amplifier 57 and the clutch-operating motor 42 operates a clutch mechanism in accordance with an operation of the zoom switch 18 to change manual and automatic operations. Moreover, an output of the potentiometer 46 for detecting a clutch position (pressed state) of the movable plate 32 of the clutch mechanism is input to the CPU 50 through an A/D converter 58.

According to the above configuration, the automatic manual-and-automatic-operation change mode and the manual-operation mode are changed by the mode change switch 26. When the automatic manual-and-automatic-operation change mode is selected, the CPU 50 inputting an operation signal of the zoom switch 18 presses the movable plate 32 against the fixed plate 33 by the clutch-operating motor 42 to connect a clutch. At the same time, the CPU 50 moves the zooming ring 14 by the zoom motor 40 through the fixed plate 33, movable plate 32, and external teeth 15 and moves a zoom lens in the telescopic direction or wide angle direction at a speed corresponding to a pressed distance of the zoom switch 18. Moreover, when the manual-operation mode is selected, the CPU 50 sets the movable plate 32 to a manual clutch position and even when an operation signal is output from the zoom switch 18, stops zooming.

Moreover, clutch positions of the movable plate 32 are changed in the manual-operation mode in accordance with the voltage Va set by the adjusting dial 19 and the operation torque of the zooming ring 14 can be freely set by the dial 19.

Figure 6:
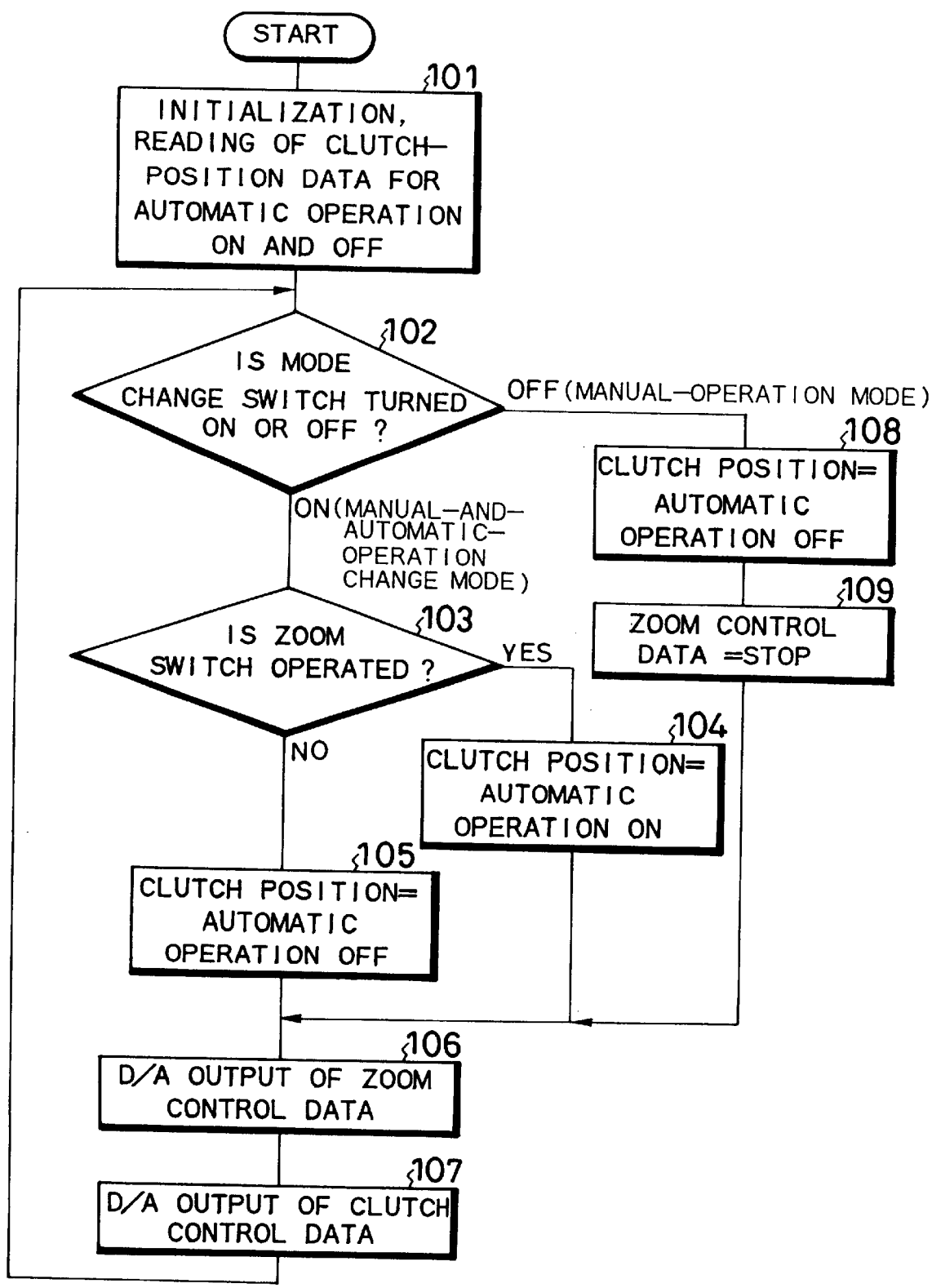
FIG. 6 is a flow chart showing control operations executed by a CPU of the first embodiment.

The first embodiment comprises the above configuration and the CPU 50 in FIG. 1 executes the operations in FIG. 6. In FIG. 6, initialization is executed in Step 101, and automatic and manual clutch-position data, that is, automatic-operation-ON position data and automatic-operation-OFF position data are read out of the ROM 52. In the next Step 102, it is determined whether the mode change switch 26 (26F) is turned on (automatic manual-and-automatic-operation change mode) or turned off (manual-operation mode). When the switch 26 is turned on, it is determined in Step 103 whether the zoom switch 18 is operated.

In Step 103, when a determined result is "YES," Step 104 is started because automatic operation is performed, a driving-clutch position is set to automatic-operation-ON position data, zoom control data corresponding to a pressed distance of the zoom switch 18 is output to the D/A converter 54 in Step 106, and clutch control data is output to the D/A converter 56 in Step 107. Then, the clutch-operating motor 42 operates, the movable plate 32 and fixed plate 33 of the clutch mechanism are connected to each other by the pressure, and the zoom lens is automatically driven in accordance with the operational direction and pressed distance of the zoom switch 18 by the zoom motor 40.

When a determined result is "NO" in the above Step 103, Step 105 is started because manual operation is ready to set a clutch position to the automatic-operation-OFF position data. In this case, the pressure of the movable plate 32 against the fixed plate 33 is decreased by the clutch-operating motor 42, the plate 32 is disconnected from the plate 33, and manual operation is ready.

However, when it is detected that the mode change switch 26 is turned off in the above Step 102, a clutch position is set to the automatic-operation-OFF position data in Step 108 because the manual-operation mode is selected and zoom control data is set to "stop" in Step 109. Therefore, in this case, even if the clutch mechanism is disconnected in Step 107, manual operation is ready, and the zoom switch 18 is operated, stop data is set as zoom control data in Step 106 and therefore, the zoom motor 40 does not operate.

Moreover, in the clutch mechanism disconnected state set by the manual-operation mode, the movable plate 32 is not completely separated from the fixed plate 33 but it is pressed by the spring 34 at a small energizing force. In the case of the first embodiment, by adjusting the friction-face pressure, manual operation torques can be changed. That is, a clutch position equivalent to a rotation angle of the clutch-operating motor 42 can be adjusted by the position control voltage Va set by the adjusting dial 19. Therefore, by making the pressure of the movable plate 32 against the fixed plate 33 smaller than the standard value, the operation torque decreases. However, by making the pressure larger than the standard value, the operation torque increases.

As described above, according to the configuration of the first embodiment, the automatic manual-and-automatic-operation change mode and the manual-operation mode for enabling only manual operation are changed by a changeover switch. Therefore, it is prevented to unexpectedly move a lens under manual operation by an apparatus not requiring the change of manual and automatic operations and stable manual operation can be performed. Moreover, there is an advantage that manual operation torques can be freely changed by operation-torque change means.

Second Embodiment

The general configuration and main mechanical configuration of the lens barrel of the second embodiment is the same as those in FIGS. 2 to 5. That is, when pressing a zoom switch 18 in FIG. 3, a moving gear 36 screwed to a main shaft 31 is moved backward by a clutch-operating motor 42 and thereby, a movable plate 32 is strongly pressed against a fixed plate 33 through a coil spring 34, and a clutch mechanism is connected as shown in FIG. 2. Thereby, rotation of a zoom motor 40 is transmitted to a zooming ring 14 through a gear 41, fixed-plate external teeth 33G, movable-plate external teeth 32G, and external teeth 15. That is, in the telescopic (expanding) direction or wide angle (contracting) direction operated by a zoom switch 18, the zoom motor 40 rotates at a speed corresponding to a pressed depth (pressed distance) and thereby, enlargement or contraction zooming is performed. However, when canceling the pressed state of the zoom switch 18, the moving gear 36 is moved forward by the clutch-operating motor 42 and the energizing force of the coil spring 34 is decreased, the pressure of the movable plate 32 against the fixed plate 33 decreases, and as a result, the clutch mechanism is disconnected.

Then, in the case of the second embodiment, manual operation torques of the zooming ring 14 supplied by the clutch mechanism when connected are changed correspondingly to a control input (depth) of a zoom switch 118 by changing rotational positions (clutch positions) of the moving gear 36 by a CPU to be described later and adjusting the pressure (friction force) of the movable plate 32 against the fixed plate 33 through the coil spring 34.

Figure 7:
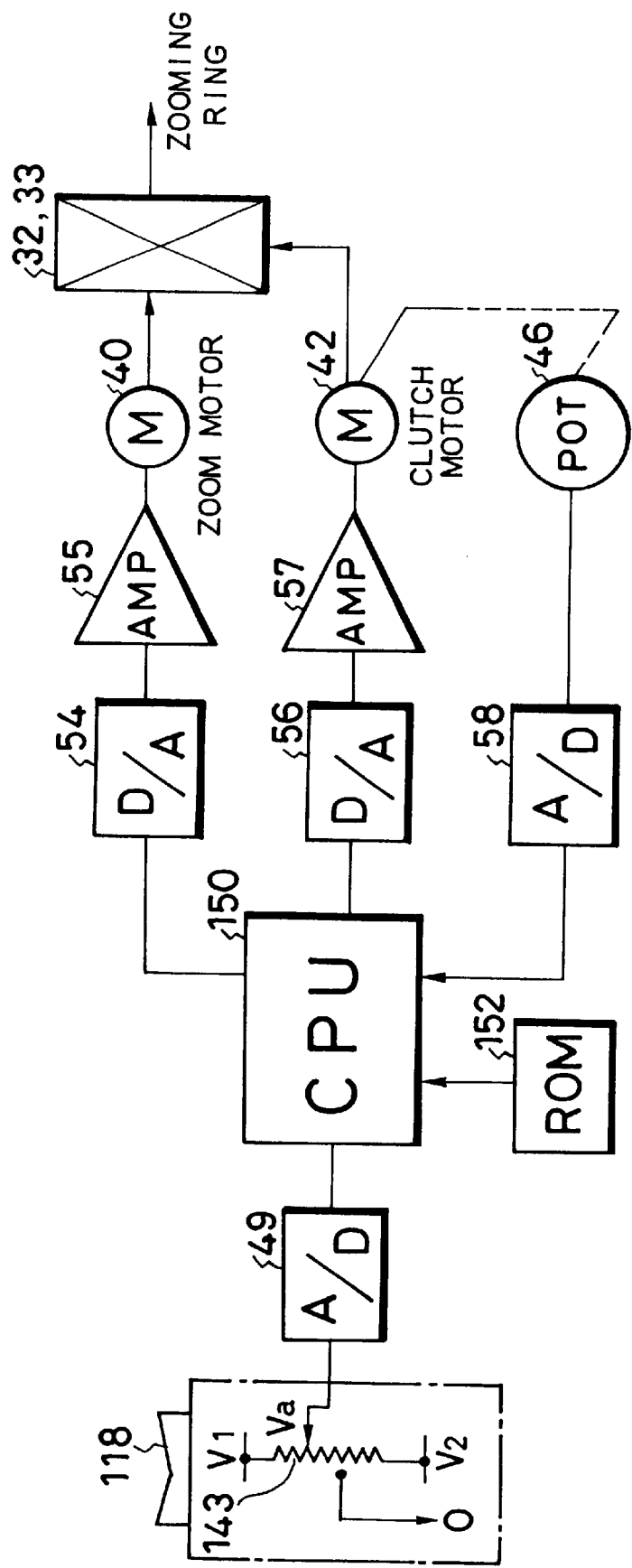
FIG. 7 is a circuit diagram showing an electrical configuration of a manual and automatic apparatus for a lens barrel of a second embodiment of the present invention.

FIG. 7 shows an electrical configuration of the apparatus of the second embodiment. The zoom switch 118 at the left of FIG. 7 outputs a voltage Va between reference voltages V1 and V2 by assuming an intermediate position under seesaw operation as 0 in a variable resistor 143. Enlarging or contracting direction of zoom and its driving speed are controlled in accordance with the magnitude of the voltage Va. A CPU 150 including torque control means is connected to the zoom switch 118 through the A/D converter 49 and a ROM 152 storing the data necessary for control operations is connected to the CPU 150. Moreover, an output control signal of the CPU 150 is supplied to the zoom motor 40 through a D/A converter 54 and a power amplifier 55 and the zoom motor 40 drives the zooming ring 14 through the movable plate 32 and fixed plate 33.

Moreover, the output control signal of the CPU 150 is also supplied to the clutch-operating motor 42 through the D/A converter 56 and power amplifier 57. The clutch-operating motor 42 operates a clutch mechanism in accordance with the operation of the zoom switch 118 to change manual and automatic operations. Moreover, an output of the potentiometer 46 for detecting a clutch position (pressed state) of the movable plate 32 of the clutch mechanism is input to the CPU 150 through the A/D converter 58.

Figure 8:
FIG. 8(A) is an illustration showing clutch positions for simply connecting or disconnecting a clutch mechanism in the second embodiment.
FIG. 8(B) is an illustration showing clutch positions and generated torque set in accordance with a driving speed in the second embodiment.
Figure 8:
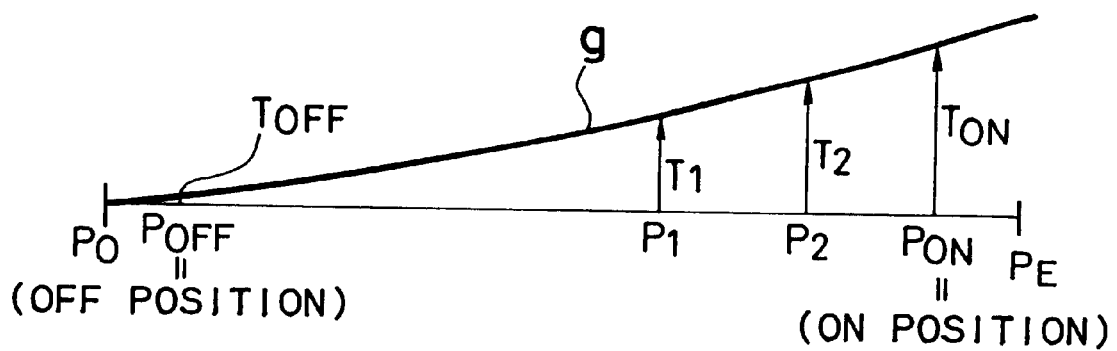

Then, the CPU 150 variably controls the clutch position correspondingly to a control input (depth) of the zoom switch 18, that is, a driving speed (the voltage showing the control input corresponds to the driving speed one-to-one) and stepwise changes torques generated when the clutch mechanism is connected. That is, FIG. 8(A) shows the control of clutch positions when they are not variably controlled, unlike the case of the present invention. When it is assumed that a moving range of the clutch-operating motor 42 (or moving gear 36) ranges between clutch positions $P_0$ (e.g. pressure 0) and $P_E$ (maximum pressure), the clutch-mechanism disconnecting position is set to the automatic-operation-OFF position $P_{OFF}$ and the clutch-mechanism connecting position is set to the automatic-operation-ON position $P_{ON}$. Therefore, in this case, the clutch position is moved to the automatic-operation-ON position $P_{ON}$ by the clutch-operating motor 42 when the zoom switch 18 is operated and returned to the automatic-operation-OFF position $P_{OFF}$ when the zoom switch 18 is not operated.

In the case of the second embodiment, however, as shown in FIG. 8(B), a clutch position is set to the position $P_1$ when the control input in enlarging and contracting directions of the zoom switch 18 (voltage for detecting pressed distance corresponding to driving speed) is less than 60% of the maximum control input, the position $P_2$ ($P_1<P_2$) when it ranges between 60 and 80% of the maximum control input, and the completely-connected position $P_{ON}$ when it exceeds 80% of the control input. Moreover, the torque of the clutch mechanism thereby generated (load due to friction-face pressure to be added as operation torque of zooming ring 14) shows a torque $T_1$ at the position $P_1$ and a torque $T_2$ (three stages) at the position $P_2$ to the torque $T_{ON}$ at the completely-connected position $P_{ON}$ as indicated by a curved line g. Thus, generated torque T lowers as a control input (driving speed) decreases. It is permitted to set clutch positions at four or five stages or to continuously change the clutch positions in accordance with a control input.

In the case of this embodiment, as shown in FIG. 8(B), a torque $T_{OFF}$ smaller than the case of the automatic-operation-OFF position $P_{OFF}$ is generated. Therefore, it is possible to set the manual operation torque of the zooming ring 14 at the time of automatic operation OFF to an optional value by changing the torque $T_{OFF}$ by the above adjusting dial 19. That is, by keeping the movable plate 32 and fixed plate 33 so that they contact each other at a low pressure without completely separating them from each other even when the clutch mechanism is disconnected and changing energizing forces (loads due to friction-face pressure) of the coil spring 34 under the above state, it is possible to freely change manual operation torques at the time of original manual setting.

Figure 9:
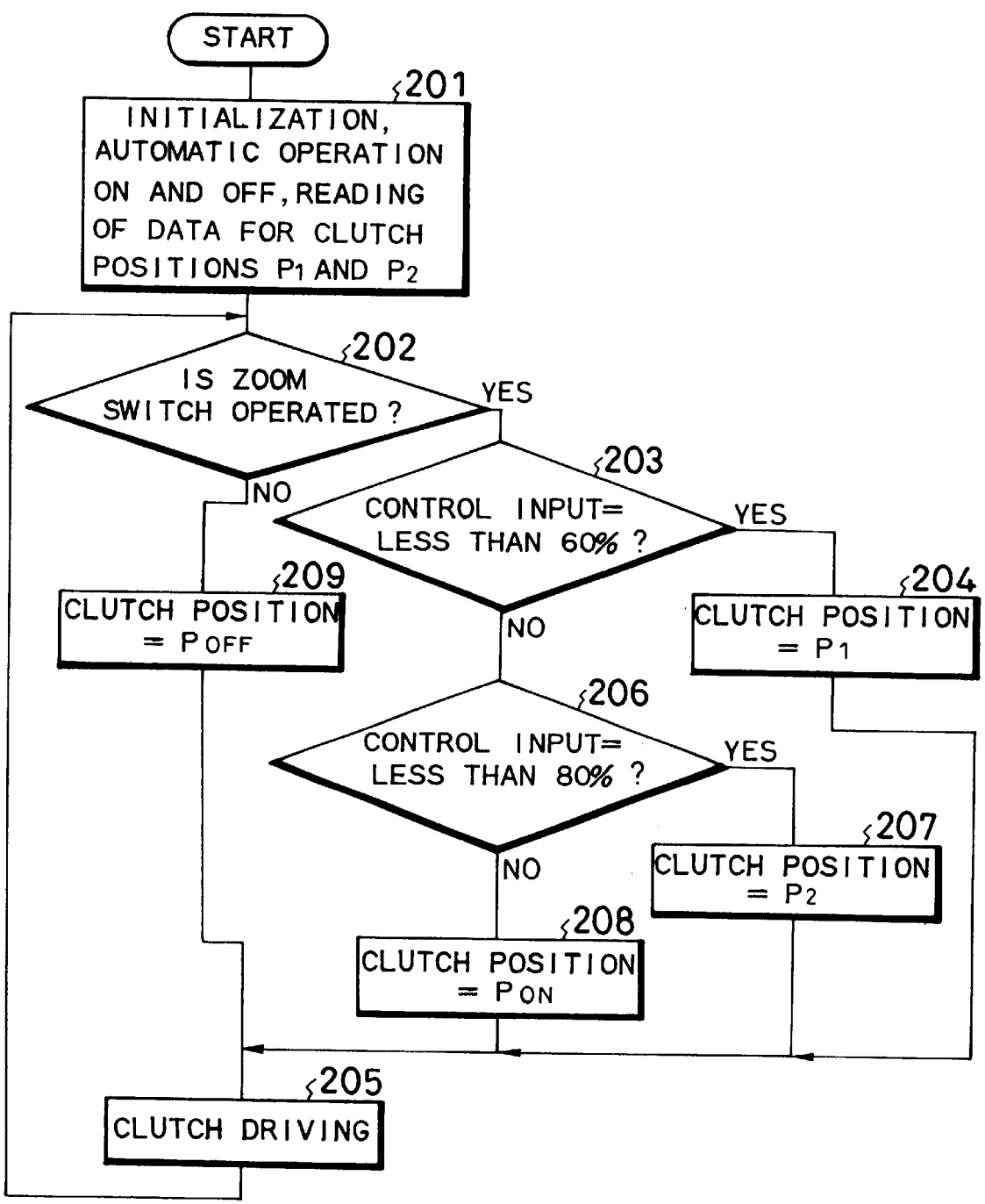
FIG. 9 is a flow chart showing control operations executed by a CPU of the second embodiment.

The second embodiment is configured as described above and the CPU 150 in FIG. 7 executes the operations in FIG. 9. In FIG. 9, initialization is performed in Step 201 and the data for the above automatic-operation-ON position $P_{ON}$, automatic-operation-OFF position $P_{OFF}$, position $P_1$, and position $P_2$ serving as clutch-position data are read out of the ROM 152. In the next Step 202, it is determined whether the zoom switch 18 is operated. In this case, when a determined result is "YES," automatic operation is performed. Therefore, Step 203 is started to determine whether the control input is less than 60%.

In Step 203, when a determined result is "YES," a clutch position is set to the data for the position $P_1$ in Step 204 to execute clutch driving in Step 205. That is, the clutch-operating motor 42 operates, the movable plate 32 and fixed plate 33 of the clutch mechanism are connected to each other to generate the torque $T_1$, and the zoom motor 40 operates to automatically drive a zoom lens in the enlarging or contracting direction in accordance with the operational direction and pressed distance of the zoom switch 18.

Moreover, when a determined result is "NO" in Step 203, Step 206 is started to determine whether the control input is less than 80%. When a determined result is "YES," a clutch position is set to the data for the position $P_2$ in Step 207. In this case, the torque $T_2$ slightly larger than the torque $T_1$ is generated because the clutch mechanism is connected. However, when compared to the case of complete connection, the movable plate 32 and fixed plate 33 are connected to each other at a small connection force. Therefore, when the control input of the zoom switch 18 is small, it is possible to rotate the zooming ring 14 through manual operations at operation torques $T_1$ and $T_2$ even when the ring 14 is automatically driven by the zoom motor 40.

Then, when a determined result is "NO" in Step 206. a clutch position is set to the automatic-operation-ON position $P_{ON}$ in Step 208. In this case, the clutch mechanism is completely connected (torque $T_{ON}$), the rotation of the zoom motor 40 is transmitted to the zooming ring 14 through the movable plate 32 and fixed plate 33, and thereby a zoom lens is driven.

However, when a determined result is "NO" in Step 202, Step 209 is started because manual operation is ready when the operation of the zoom switch 18 is canceled to set a clutch position to the data for the automatic-operation-OFF position $P_{OFF}$. In this case, the movable plate 32 and fixed plate 33 are disconnected from each other due to the driving operation in Step 205. However, an operation torque $T_{OFF}$ is generated because of a slight contact between the plates 32 and 33 due to the energizing force of the spring 34 and original manual operation can be performed by the operation torque $T_{OFF}$.

Moreover, the apparatus of this embodiment can be provided with an auto cruise function (constant-speed zoom function) for keeping a lens-driving speed constant. Also in the case of the auto cruise function, the above three-stage clutch positions $P_{ON}$, $P_1$, and $P_2$ (or continuous position) are set correspondingly to a driving speed selected by the zoom switch 18. Therefore, under the constant-speed zooming set to a speed less than 80% of the maximum speed, it is possible to manually move the zooming ring 14.

As described above, according to the second embodiment, a torque control means for changing connection forces of the clutch mechanism in accordance with a driving speed set by the automatic operation switch to control the operation torque of the lens-operating ring so that the torque decreases as the driving speed lowers. Therefore, manual operation can be performed when the driving speed is low even under automatic operation and camera work can be quickly performed without missing a photographing opportunity.

Third Embodiment

Figure 10:
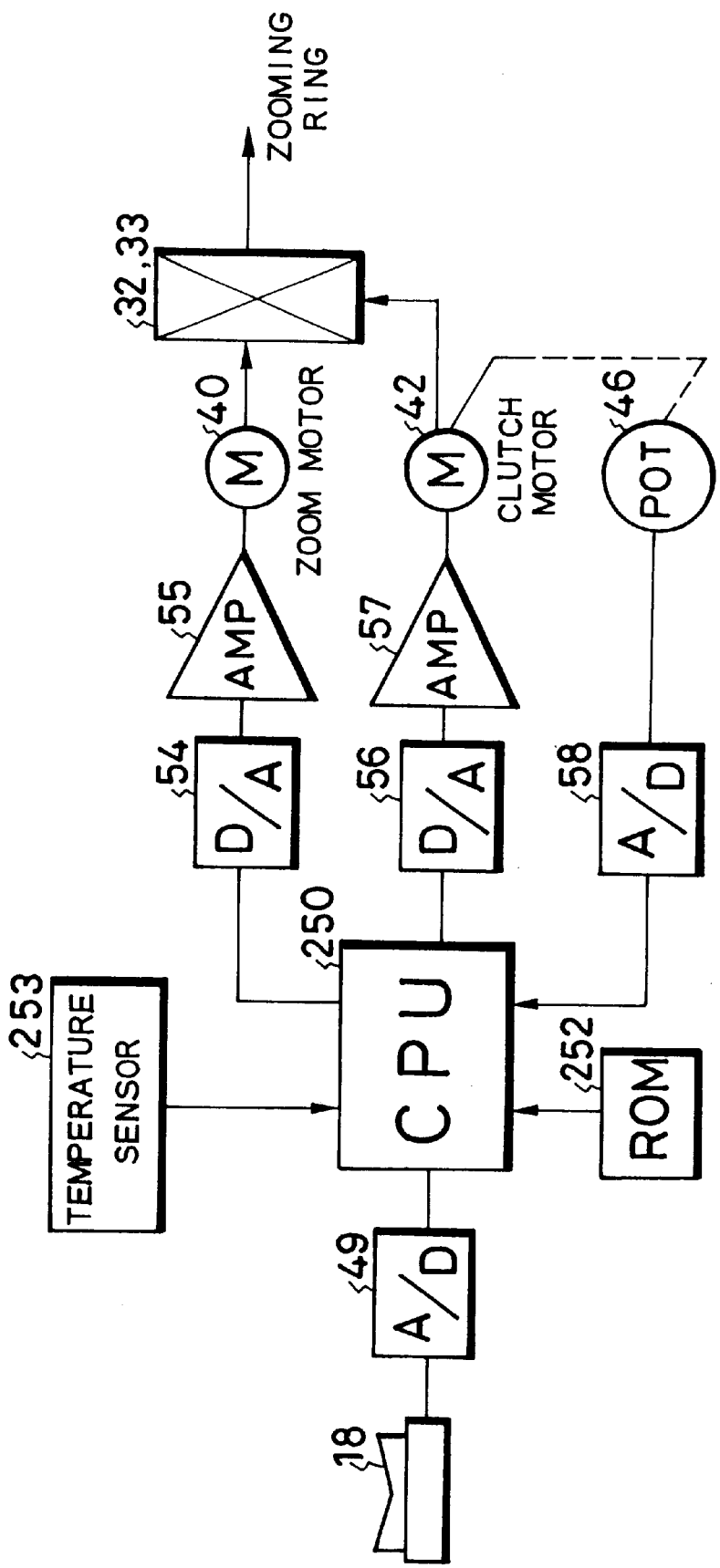
FIG. 10 is a circuit diagram showing an electrical configuration of a manual and automatic apparatus for a lens barrel of a third embodiment of the present invention.
Figure 11:
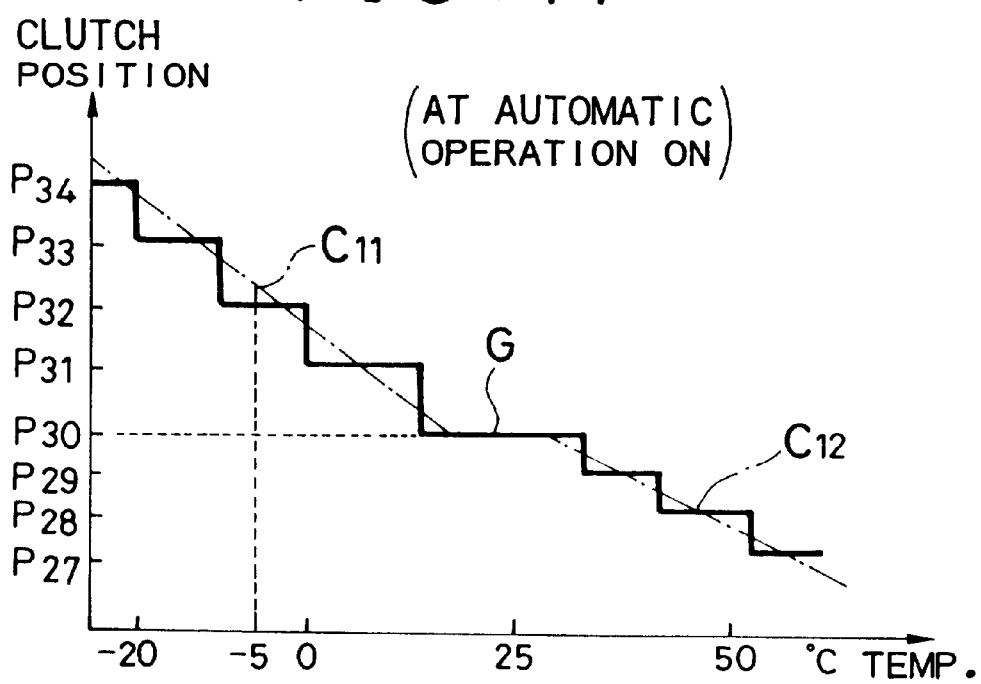
FIG. 11 is a graph showing the control of clutch positions corresponding to temperature change under automatic operation ON in the third embodiment.
Figure 12:
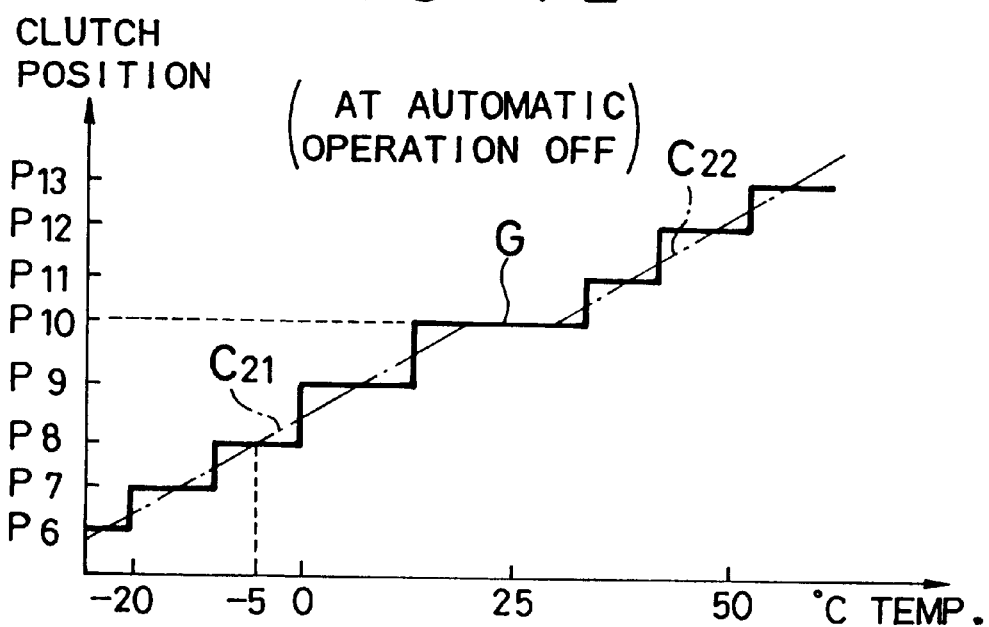
FIG. 12 is a graph showing the control of clutch positions corresponding to temperature change under automatic operation OFF in the third embodiment.

FIGS. 10 to 12 show a configuration of a manual and automatic apparatus for a lens barrel of the third embodiment and the general configuration and main mechanical configuration of the third embodiment are the same as those in FIGS. 2 to 5. That is, a focus ring 13 and a zooming ring 14 are set to the periphery of a lens barrel 10 so as to be manually rotatable and external teeth 15 for automatic driving are formed on the periphery of the zooming ring 14.

Moreover, a zoom switch 18 configured of a seesaw switch and an adjusting dial 19 for variably setting the operation torque at the time of manual setting are set to a holding portion 17 arranged on the periphery of the lens barrel 10.

As shown in FIG. 2, a movable plate 32 to be rotatable on the periphery of a main shaft 25, fixed plate 33, coil spring 34, first thrust bearing 35, moving gear 36, and second thrust bearing 38 are set as a clutch mechanism and the zooming ring 14 engages with the movable plate 32. Then, the movable plate 32 is energized by the coil spring 34 and thereby, clutch connection is performed. Moreover, a disk 35A of the first thrust bearing 35, the coil spring 34, and the movable plate 32 rotate independently of the moving gear 36 to function as a disconnection-time rotational mechanism for rotating the movable plate 32 separately from the fixed plate 33 under manual operation.

Furthermore, a front disk 38B of the second thrust bearing 38 is fixed to the fixed plate 33 and a shaft gear 41 of the zoom motor 40 engages with external teeth 33G of the fixed plate 33. Therefore, the torque of the zoom motor 40 is supplied to the zooming ring 14 through the shaft gear 41, fixed-plate external teeth 33G, movable-plate external teeth 32G, and external teeth 15.

Furthermore, a clutch-operating motor 42 for operating the clutch mechanism is set and a shaft gear 43 of the motor 42 is engaged with the moving gear 36 at the first thrust bearing-35 side. Then, a potentiometer 46 is connected to the shaft gear 43 of the clutch-operating motor 42 through a gear 45, which detects a rotating state (clutch position) of the moving gear 36 at the first thrust bearing-35 side, that is, a pressed state of the movable plate 32.

According to the above configuration, when the moving gear 36 is moved backward by the clutch-operating motor 42 and the movable plate 32 is strongly pressed against the fixed plate 33 through the coil spring 34, the clutch mechanism is connected. In this case, the rotation of the zoom motor 40 is transmitted to the zooming ring 14. Moreover, when the moving gear 36 is moved forward by the clutch-operating motor 42, the pressure of the movable plate 32 against the fixed plate 33 decreases and as a result, the clutch mechanism is disconnected and manual operation is ready.

Moreover, at the time of the manual operation setting, a clutch position is adjusted by the adjusting dial 19 and the manual operation torque of the zooming ring 14 can be optionally set at the time of automatic operation OFF. That is, manual operation torques can be freely changed by keeping the movable plate 32 and fixed plate 33 so that they contact each other at a low pressure without completely separating them from each other even when the clutch mechanism is disconnected and changing energizing forces (friction-face pressures) of the coil spring 34 by the adjusting dial 19 under the above state.

Furthermore, in the case of this embodiment, by changing rotational positions (clutch positions) of the moving gear 36 by a CPU determining an environmental temperature to be mentioned later and adjusting the friction-face pressure of the movable plate 32 against the fixed plate 33 through the coil spring 34, torques for driving the zooming ring 14 are changed when clutch mechanism is connected and operation torques (loads to be added) of the zooming ring 14 are changed when the clutch mechanism is disconnected.

FIG. 10 shows an electrical configuration of the third embodiment. The illustrated zoom switch 18 is connected to a CPU 250 including clutch control means through an AD converter 49 and a ROM 252 storing the clutch-position compensation data corresponding to air temperature and the data necessary for control operations is connected to the CPU 250. Moreover, as described for the first and second embodiments, the CPU 250 controls the zoom motor 40 and clutch motor 42 in accordance with an input of the potentiometer 46 for detecting a clutch position.

Then, a temperature sensor 253 for measuring an environmental temperature (air temperature) is set to a circuit board or the like and an output of the temperature sensor 253 is input to the CPU 250. The CPU 250 variably controls a clutch position in accordance with a temperature detected by the temperature sensor 253 and sets a friction-face pressure so that it decreases as temperature rises under automatic operation and increases as temperature rises under manual operation. That is, FIG. 11 shows the control of clutch positions under automatic operation ON, in which a clutch position is set to a position $P_{30}$ for obtaining an optimum driving torque in ordinary temperature range G including a temperature 25° C. but positions $P_{31}$, $P_{32}$, $P_{33}$, and $P_{34}$ are set so that friction pressure (connection force) stepwise rises as air temperature lowers and positions $P_{29}$, $P_{28}$, and $P_{27}$ are set so that friction pressure stepwise lowers as air temperature rises.

FIG. 12 shows the control of clutch positions under automatic operation OFF, in which a clutch position is set to a position $P_{10}$ for obtaining an optimum operation torque in ordinary temperature range G including a temperature 25° C. but positions $P_9$, $P_8$, $P_7$, and $P_6$ are set so that friction pressure stepwise lowers as air temperature lowers and positions $P_{11}$, $P_{12}$, and $P_{13}$ are set so that friction pressure stepwise rises as air temperature rises. Moreover, continuous control is permitted instead of the above stepwise control like control lines $C_{11}$, $C_{12}$, $C_{21}$, and $C_{22}$ as shown in FIGS. 11 and 12.

Figure 13A:
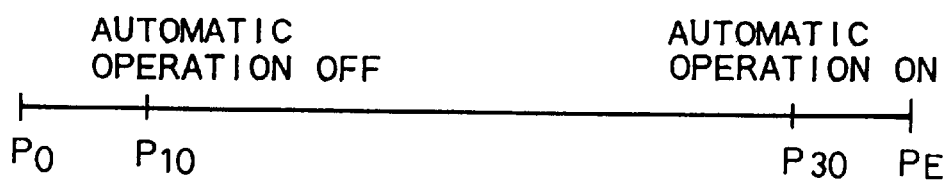
FIG. 13(A) is an illustration showing set clutch positions at ordinary temperature in the third embodiment.
Figure 13B:
FIG. 13(B) is an illustration showing set clutch positions at a low temperature in the third embodiment.
Figure 13C:
FIG. 13(C) is an illustration showing set clutch positions at a high temperature in the third embodiment.

FIGS. 13(A) to 13(C) show the control of clutch positions at ordinary temperature, low temperature, or high temperature. As shown in FIG. 13(A), when assuming that the moving range of the clutch-operating motor 42 (or moving gear 36) is kept between clutch positions $P_0$ (e.g. pressure of 0) and $P_E$ (maximum friction-face pressure), a clutch-mechanism disconnecting position is set to position $P_{10}$ (automatic-operation-OFF position) and a clutch-mechanism connecting position is set to $P_{30}$ (automatic-operation-ON position) at ordinary temperature. Moreover, as shown in FIG. 13(B), at a low temperature such as −5° C., the disconnecting position is compensated to $P_8$ (automatic-operation-OFF position) and the connecting position is compensated to $P_{32}$ (automatic-operation-ON position).

That is, at a low temperature, friction-face pressure under automatic operation increases compared to the case of ordinary temperature. Therefore, the automatic-driving torque of the zooming ring 14 is increased but friction pressure under manual operation decreases. Therefore, the operation torque (additional torque) of the zooming ring 14 is decreased.

Moreover, as shown in FIG. 13(C), the disconnecting position is compensated to $P_{12}$ (automatic-operation-OFF position), the connecting position is compensated to $P_{28}$ (automatic-operation-ON position) at a high temperature, and the friction-face pressure under automatic operation decreases compared to the case of ordinary temperature. Therefore, the automatic-driving torque of the zooming ring 14 is decreased. However, because the friction-face pressure under manual operation increases, the operation torque of the zooming ring 14 is increased. As described above, in the case of this embodiment, it is possible to optionally set the operation torque of the zooming ring 14 at the time of manual setting by operating the adjusting dial 19. However, the operation torque is adjusted by adding or subtracting an adjustment value on the basis of the above clutch-position compensating position according to air temperature.

The third embodiment comprises the above configuration and the CPU 250 in FIG. 10 executes the operations in FIG. 14. In FIG. 14, initialization is performed in Step 301 and the data for the automatic-operation-ON position P30 and automatic-operation-OFF position P10 serving as clutch-position data at ordinary temperature are read out of the ROM 46. In the next Step 302, it is determined whether the zoom switch 18 is operated. When a determined result is "YES," Step 303 is started to set the automatic-operation-ON clutch position $P_{ON}$ to the data for $P_{30}$ because automatic operation is currently performed.

However, when a determined result is "NO" in Step 302, the automatic-operation-OFF clutch position $P_{OFF}$ is set to the data for the position $P_{10}$ in Step 304 because manual operation is ready. In the next Step 305, it is determined whether timer interrupt occurs at a certain time interval. When a determined result is "YES," air temperature is detected by the temperature sensor 253 in Step 306 and Step 307 is started. In Step 307, automatic-operation-ON-and-OFF compensated clutch positions corresponding to air temperature are read and the clutch positions $P_{ON}$ and $P_{OFF}$ are updated in the next Step 308. That is, when air temperature is kept in the ordinary-temperature range, clutch positions are not updated. However, when air temperature is, for example, −5° C., $P_{ON}=P_{32}$ and $P_{OFF}=P_{8}$ are updated as shown in FIG. 13(B).

Then, in the next Step 309, clutch driving is executed and the clutch-operating motor 42 rotates up to the above clutch positions. When air temperature is kept in the ordinary-temperature range, the motor 42 is rotated up to the clutch position $P_{30}$ when the zoom switch 18 is operated and rotated up to the clutch position $P_{10}$ when the switch 18 is not operated. In this case, the zooming ring 14 is driven at an optimum driving torque in accordance with the pressure of the friction face between the movable plate 32 and fixed plate 33 when automatic operation is performed and an optimum operation torque is supplied to the zooming ring 14 when manual operation is performed.

When air temperature is −5° C. as described above, however, the pressure of the friction face between the movable plate 32 and fixed plate 33 increases compared to the case of ordinary temperature due to rotation to the compensated clutch position $P_{32}$ under automatic operation as shown in FIG. 13(B) and thereby, the zooming ring 14 is rotated at a high driving torque for compensating a value equivalent to an increase in weight due to a fall of air temperature. Therefore, even at a low temperature, a lens can be driven at the same speed as the case of ordinary temperature. Moreover, the pressure of the friction face between the movable plate 32 and the fixed plate 33 decreases compared to the case of ordinary temperature due to rotation to the compensated clutch position $P_{8}$ under manual operation and an operation torque from which a value equivalent to an increase in weight due to a fall of air temperature is subtracted is supplied to the zooming ring 14. Therefore, even at a low temperature, the zooming ring 14 can be manually operated at the same operation torque as the case of ordinary temperature and thereby, it is possible to secure stable zooming. Moreover, it is possible to secure the same driving torque or operation torque even at a high temperature by generating a torque compensated by a value equivalent to a decrease in weight due to a rise of air temperature as shown in FIG. 13(C).

As described above, according to the third embodiment, even when the apparatus is used at an environmental temperature out of ordinary temperature, it is possible to stabilize manual operability and automatic operations. That is, a constant operability is obtained under manual and automatic operations.

For each of the above embodiments, a case is described in which the above configuration is used for the zooming ring 14. However, the above configuration can also be applied to the focusing ring 13.

What is claimed is:

1. A manual and automatic apparatus for a lens barrel, comprising:

a lens barrel for holding a lens so as to be movable;

a lens-operating ring rotatably set to the periphery of the lens barrel to manually move the lens;

an electric motor for automatically moving the lens;

automatic manual-and-automatic-operation change means for connecting the electric motor with lens-operating ring by a clutch mechanism to perform connection or disconnection of the clutch mechanism by making the connection or disconnection interlock with the operation of an automatic operation switch; and a mode change switch for changing an automatic manual-and-automatic-operation change mode for operating the automatic manual-and-automatic-operation change means and a manual-operation mode for enabling only manual operation by disconnecting the clutch mechanism.

2. The manual and automatic apparatus for a lens barrel according to claim 1, further comprising operation-torque change means for adjusting the pressure of the friction face of the clutch mechanism and changing manual operation torques of the lens-operating ring is included.

3. The manual and automatic apparatus for a lens barrel according to claim 1, further comprising:

a gear moving plate having a gear function for engaging with the lens-operating ring side and functioning as a movable clutch plate;

a gear fixing plate executing a clutch function by connecting with the gear moving plate and having a gear function for engaging with the electric motor side;

a clutch-operating motor for connecting or disconnecting a clutch mechanism by the gear moving plate and the gear fixing plate; and a disconnection-time rotation mechanism for making the gear moving plate rotatable when the clutch mechanism is disconnected.

4. A manual and automatic apparatus for a lens barrel, comprising:
- a lens barrel for holding a lens so as to be movable;
- a lens-operating ring rotatably set to the periphery of the lens barrel to manually move the lens;
- an electric motor for automatically moving the lens;
- a clutch mechanism for connecting or disconnecting the electric motor with or from the lens-operating ring;
- an automatic operation switch for automatically driving the lens-operating ring through the clutch mechanism and setting a lens-operating-ring driving speed; and
- torque control means for changing connection forces of the clutch mechanism in accordance with the driving speed set by the automatic operation switch to control the lens-operating-ring operation torque so that the torque decreases as driving speed lowers.

5. The manual and automatic apparatus for a lens barrel according to claim 4, further comprising a constant-speed zooming function for keeping a lens-driving speed constant is included.

6. A manual and automatic apparatus for a lens barrel, comprising:
- a lens barrel for holding a lens so as to be movable;
- a lens-operating ring rotatably set to the periphery of the lens barrel to manually move the lens;
- an electric motor for automatically moving the lens;
- a clutch mechanism for connecting or disconnecting the electric motor with or from the lens-operating ring;
- a temperature sensor for measuring an environmental temperature; and
- clutch control means for changing friction-face pressures of the clutch mechanism correspondingly to a temperature detected by the temperature sensor to secure stable rotation of the lens-operating ring.

7. The manual and automatic apparatus for a lens barrel according to claim 6, wherein the clutch control means sets a friction-face pressure so as to decrease as temperature rises under automatic operation and so as to increase as temperature rises under manual operation.

* * * * *